(12) United States Patent
Ballocca et al.

(10) Patent No.: US 9,386,293 B2
(45) Date of Patent: Jul. 5, 2016

(54) METHOD FOR GENERATING AND REBUILDING A STEREOSCOPIC-COMPATIBLE VIDEO STREAM AND RELATED CODING AND DECODING DEVICES

(75) Inventors: Giovanni Ballocca, Turin (IT); Paolo D'Amato, Rome (IT)

(73) Assignee: S.I.SV.EL SOCIETA' ITALIANA PER LO SVILUPPO DELL'ELETTRONICA S.P.A., None (TO) (IT)

( * ) Notice: Subject to any disclaimer, the term of this patent is extended or adjusted under 35 U.S.C. 154(b) by 567 days.

(21) Appl. No.: 13/640,248

(22) PCT Filed: Apr. 7, 2011

(86) PCT No.: PCT/IB2011/051504
§ 371 (c)(1),
(2), (4) Date: Feb. 21, 2013

(87) PCT Pub. No.: WO2011/128818
PCT Pub. Date: Oct. 20, 2011

(65) Prior Publication Data
US 2013/0201282 A1    Aug. 8, 2013

(30) Foreign Application Priority Data

Apr. 12, 2010   (IT) .............................. TO2010A0282

(51) Int. Cl.
  *H04N 13/00*   (2006.01)
  *H04N 7/12*    (2006.01)
  *H04L 29/00*   (2006.01)
  *G06K 9/00*    (2006.01)
  *G06K 9/36*    (2006.01)
  *G06F 12/00*   (2006.01)

(52) U.S. Cl.
  CPC ......... *H04N 13/0048* (2013.01); *H04N 13/004* (2013.01); *H04N 13/0022* (2013.01); *H04N 13/0066* (2013.01)

(58) Field of Classification Search
  CPC ............ H04N 13/00; H04N 7/12; G06K 9/36
  See application file for complete search history.

(56) References Cited

U.S. PATENT DOCUMENTS 7,650,036 B2   1/2010   Lei et al.
2002/0048395 A1   4/2002   Harman et al.
(Continued)

FOREIGN PATENT DOCUMENTS

EP   1 524 859 A2   4/2005
WO   2008/127676 A2   10/2008

OTHER PUBLICATIONS

Chilean Search Report issued in Chilean Application No. CL2849-12, filed Oct. 11, 2012.
(Continued)

*Primary Examiner* — Sath V Perungavoor
*Assistant Examiner* — Patricia I Young
(74) *Attorney, Agent, or Firm* — Workman Nydegger

(57) ABSTRACT

A method for generating a digital stereoscopic video stream (101) includes container frames (C), having information about a right image (R) and a left image (L), wherein, when coding the digital stereoscopic video stream (101), at least one metadatum (M) is entered which is adapted to identify a region of a container frame (C) containing only one of the two images (L,R).

25 Claims, 4 Drawing Sheets

(56) References Cited

U.S. PATENT DOCUMENTS

| | | |
|---|---|---|
| 2004/0101043 A1 | 5/2004 | Flack et al. |
| 2008/0303893 A1 | 12/2008 | Kim et al. |
| 2009/0128620 A1 | 5/2009 | Lipton et al. |
| 2012/0281068 A1 | 11/2012 | Celia et al. |
| 2012/0320279 A1 | 12/2012 | Celia et al. |

OTHER PUBLICATIONS

Singapore Written Opinion dated Aug. 16, 2013, issued in Singapore Application No. 201207309-4.

ITU-T, *Advanced Video Coding for Generic Audiovisual Services*, Series H: Audio Visual and Multimedia Systems, Mar. 2009, pp. 670.

Singapore Office Action with Written Opinion dated May 7, 2014, issued in Singapore Application No. 201207309-4, 7 pages.

Man Bae Kim et al., *The Adaptation of 3D Stereoscopic Video in MPEG-21 DIA*, Single Process: Image Communication, vol. 18, 2003, pp. 685-697.

International Search Report issued Aug. 18, 2011, Application No. PCT/IB2011/051504, filed Apr. 7, 2011.

Written Opinion issued Aug. 18, 2011, Application No. PCT/IB2011/051504, filed Apr. 7, 2011.

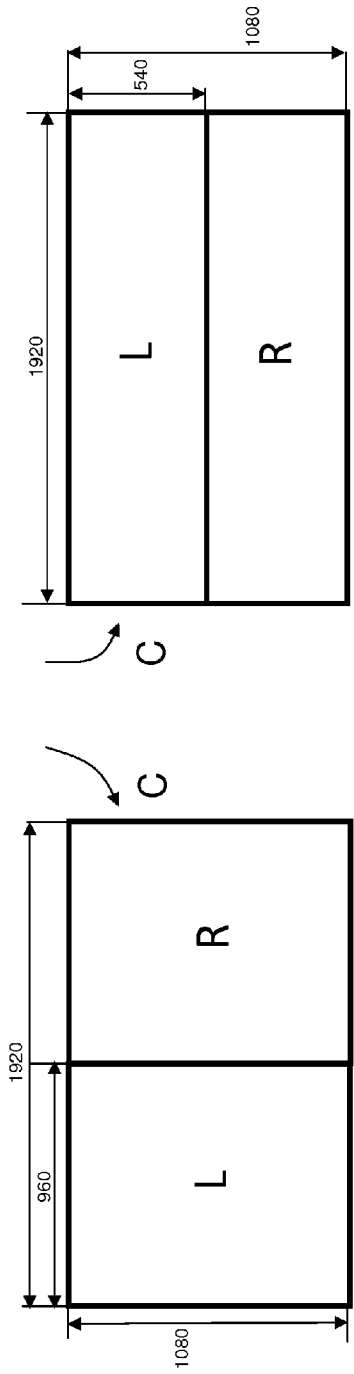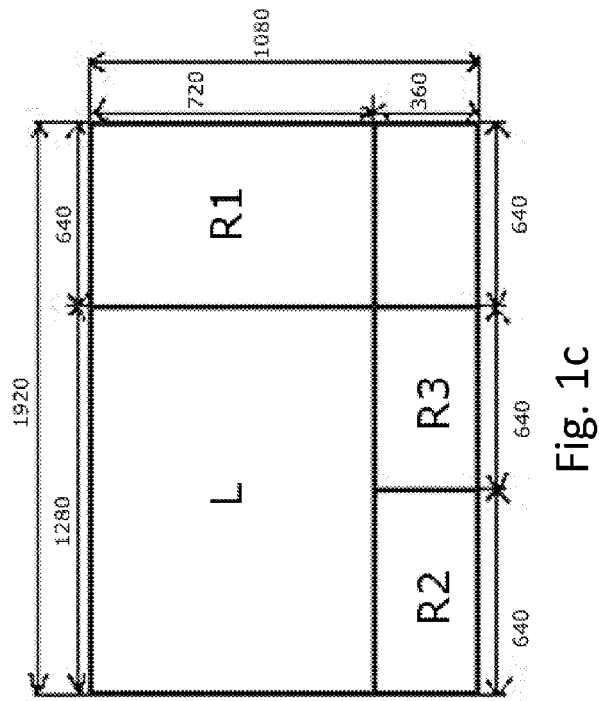
Fig. 1a
Fig. 1b
Fig. 1c

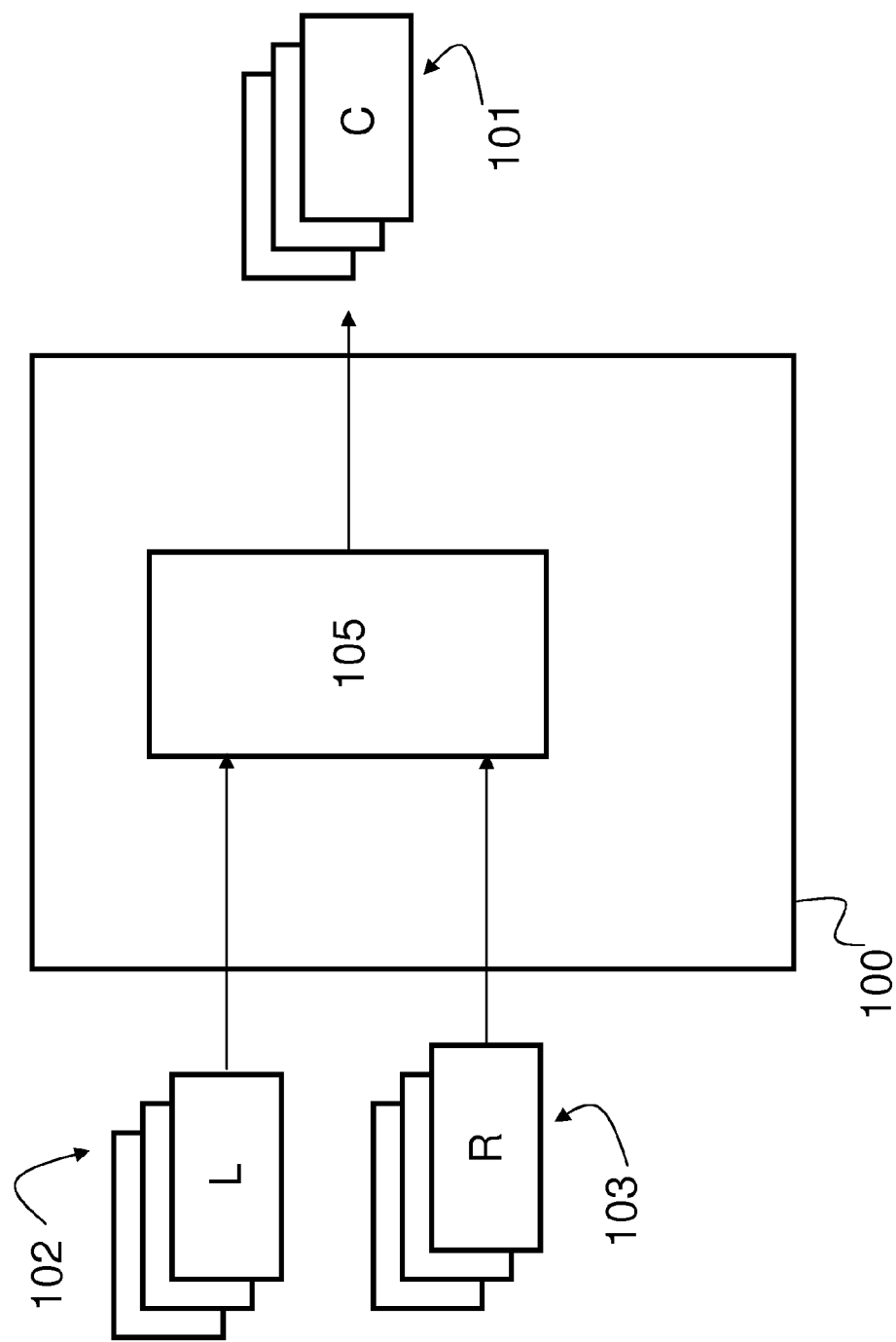

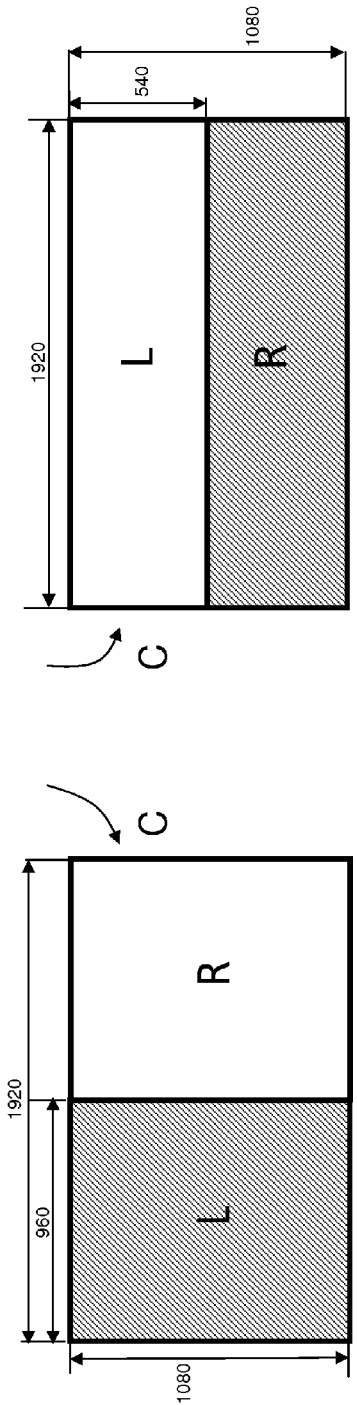
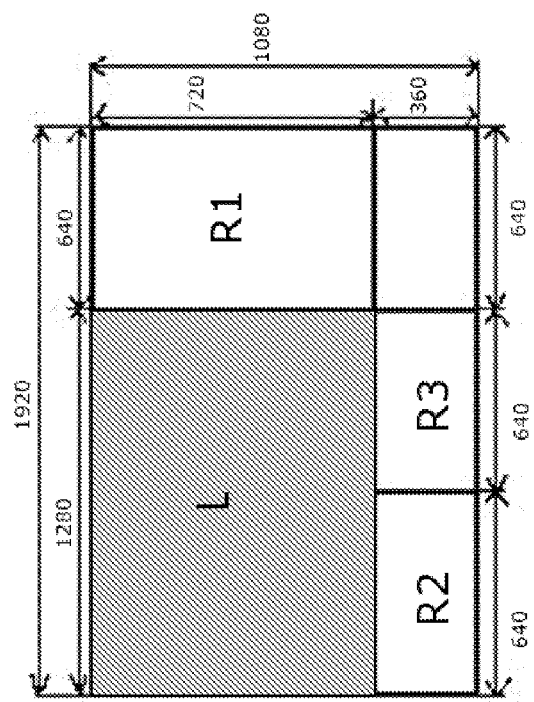
Fig. 3a
Fig. 3b
Fig. 3c

METHOD FOR GENERATING AND REBUILDING A STEREOSCOPIC-COMPATIBLE VIDEO STREAM AND RELATED CODING AND DECODING DEVICES

BACKGROUND OF THE INVENTION

1. Field of the Invention

The present invention relates to a method for generating a digital stereoscopic video stream, i.e. a video stream which, when appropriately processed in a visualisation device, produces sequences of images which are perceived as being three-dimensional by a viewer.

Such a method also allows a user having a conventional (non-stereoscopic) decoder and television set to display said images in 2D.

The present invention further relates to a coding device and a decoding device for coding and decoding a stereoscopic video stream in digital format.

2. Present State of the Art

In recent years, the cinematographic production world has paid much attention and has devoted huge resources to the production of stereoscopic 3D contents under the stimulus of new production tools made available by the new digital technologies.

The interest in 3D is now extending to domestic use, i.e. for displaying images on a television set. For example, some pay-TV operators will shortly broadcast 3D programs.

The most common approach to presenting stereoscopic video contents involves displaying two independent video streams intended for the right eye and for the left eye, respectively, which are then reassembled by the human brain into a three-dimensional object.

Stereoscopic contents for domestic use are generally high-definition video contents and may be distributed on a mass memory medium (DVD or Blu-ray discs, magneto-optic or solid-state media, etc.) or via (wired or wireless) broadcasting channels or via a telecommunication network (IP).

In the production environment, however, with the existing structures it may be impossible to transfer and handle separately the two streams produced by stereoscopic video cameras shooting a scene from two different points of view. Moreover, the distribution networks reaching the final user are so big that it is uneconomical to use two independent high-definition streams for providing a single service. As a consequence, a number of measures must be taken during the production process in order to reduce the bit-rate required for content transfer and fruition.

Since the results of studies carried out on the differences in the perception of details in two-dimensional and three-dimensions images seem to indicate that, even when the resolution of stereoscopic contents is lowered compared to that of two-dimensional contents, the quality perceived by the user remains acceptable, different techniques have been developed for packing the two images composing the stereoscopic view into a single frame.

For example, in the case of a single high-definition frame C (1920×1080 pixels), the two images composing the left and right channels (hereafter referred to as L and R) are acquired with a horizontal resolution equal to half the resolution of a high-definition frame and are then arranged side by side into a single frame (side-by-side format), as shown in FIG. 1a.

In this way, it is possible to use a single high-definition stream for transporting the two independent video channels; at decoding time, the two half-frames are separated and brought to the 16/9 format again by applying suitable interpolation techniques.

Likewise, an alternative process may be used which involves halving the vertical resolution and leaving the horizontal resolution unchanged, and then arranging the two frames L and R one on top of the other (top-bottom format), as shown in FIG. 1b.

The stereoscopic video stream consisting of composite frames is then compressed in order to reduce its transport bit-rate before distributing it on a broadcasting network, an IP network or a mass memory medium.

The compression technique mostly used at present for distributing high-definition video is the one defined by the H.264/AVC standard.

High-definition television sets currently available on the market are equipped with H.264/AVC decoders supporting format decoding up to the 1080 p format. One of the most important requirements on which the attention of the various service providers (especially public service broadcasters) is focused is the backward compatibility of the stereoscopic signals.

In fact, in order to allow those users who already own a high-definition decoder to enjoy the broadcast services, it is desirable that 3D programs can also be displayed as 2D programs. Likewise, it is desirable that a 3D content on a DVD, Blu-ray disc 3D or Internet site can be displayed by both 2D and 3D television sets and monitors.

This result can be achieved in two ways: either by simultaneously broadcasting both the 2D and 3D versions of one program or by adopting an appropriate technique for coding the stereoscopic stream.

Of course, the first option involves wasting bandwidth, which is one thing that service providers would rather avoid.

As to the second option, several techniques are known in the art for generating backward-compatible stereoscopic streams.

One of these technique relates to the application of so-called "depth maps", as described, for example, in US patent applications no. US 2002/0048395 and no. US 2004/0101043.

In practice, a signal is associated with the two-dimensional colour video in the form of a supplementary black and white video that carries the depth maps. A suitable decoder can rebuild a stereoscopic video starting from the received data. However, this technique suffers from the very same problems of the aforementioned 2D and 3D transmission of the same program: in fact, two video signals must be transferred in parallel, resulting in a high transport bit-rate.

Another backward-compatible stereoscopic stream coding technique is, for example, the one referred to as "multiview".

Because the pairs of right and left images making up the stereoscopic video stream are characterised by a high degree of resemblance, the space-time redundancy suppression techniques employed when coding two-dimensional streams can be used in this case as well. In fact, once a certain offset due to the geometric distance between the shooting points (i.e. the interocular distance) has been subtracted, the differences between the right image and the left image are small.

The MPEG2 standard has been extended with a supplementary specification called Multi View Profile (MVP); likewise, the subsequent H.264/AVC standard has been extended by including the Multi View Coding (MVC) specification.

A common character of these two specifications is the use of scalable video coding: the stereoscopic video stream is compressed into a base layer (the 2D base stream) plus an enhancement layer, which transports the second view. The syntax of the coded stream ensures that the 2D video can also be decoded by old-generation decoders, so long as they comply with the MPEG2 or H.264/AVC standards. However, the bit-rate necessary for coding stereoscopic streams into one of the above-described formats is still too high to allow it to be used in the broadcasting environment.

SUMMARY OF THE INVENTION

The purpose of the present invention is therefore to provide a method for generating and rebuilding a backward-compatible digital stereoscopic video stream which can be distributed by a broadcaster by using the same bandwidth required for a 2D stream.

It is a further object of the present invention to provide a method for generating and rebuilding a backward-compatible digital stereoscopic video stream which is based on the use of composite frames and which is always applicable regardless of how the right and left images are packed into said composite images.

These and other objects of the present invention are achieved through a method for generating and rebuilding a stereoscopic video stream incorporating the features set out in the appended claims, which are intended as an integral part of the present description.

The present invention also describes a coding device and a decoding device for coding and decoding a stereoscopic video stream, as well as a stereoscopic video stream.

The general idea at the basis of the present invention is to provide a method for generating and rebuilding a video stream comprising a plurality of frames packed according to a packing technique, so that the result of the decoding of the video stream is usable by both a 2D decoder and a 3D decoder.

In a preferred embodiment, the method according to the invention allows a video stream to be prearranged in a manner such that said stream can be decoded by a 2D decoder compliant with the H.264/AVC specification (without said decoder needing any modifications) and that it can be displayed on a high-definition display.

On the other hand, an appropriate decoder coupled to a stereoscopic display will allow the stereoscopic stream to be viewed in 3D.

The backward compatibility of the stereoscopic video stream is made possible by a different use, during the coding stage, of metadata already present within the stereoscopic video stream.

Such metadata define a region of the composite frame containing an image, whether the right or the left one, of the stereoscopic video stream.

For a 2D decoder, said metadata contains a piece of information instructing the decoder that after having decoded the frame it must output only one region of the decoded composite image, i.e. the one which contains only one image, whether the right one or the left one, of the stereoscopic stream.

Thus the broadcaster only has to transmit one stereoscopic stream, which is then appropriately processed by the decoder, whether the latter is enabled or not to decode stereoscopic video streams: the same video stream can be reproduced in 2D or 3D format depending on the characteristics of the decoder processing it. Further objects and advantages of the present invention will become more apparent from the following description of a few embodiments thereof, which are supplied by way of non-limiting example.

BRIEF DESCRIPTION OF THE DRAWINGS

Said embodiments will be described with reference to the annexed drawings, wherein:

FIGS. 1a, 1b and 1c show a composite frame of a stereoscopic video stream, respectively in the side-by-side format, in the top-bottom format and in an alternative format;

FIG. 2 shows a block diagram of a device for generating a stereoscopic video stream according to the invention;

FIGS. 3a, 3b and 3c show the composite frames of FIGS. 1a, 1b and 1c, with the cropping rectangle highlighted by a dashed line;

DETAILED DESCRIPTION OF THE PREFERRED EMBODIMENTS

Figure 4A:
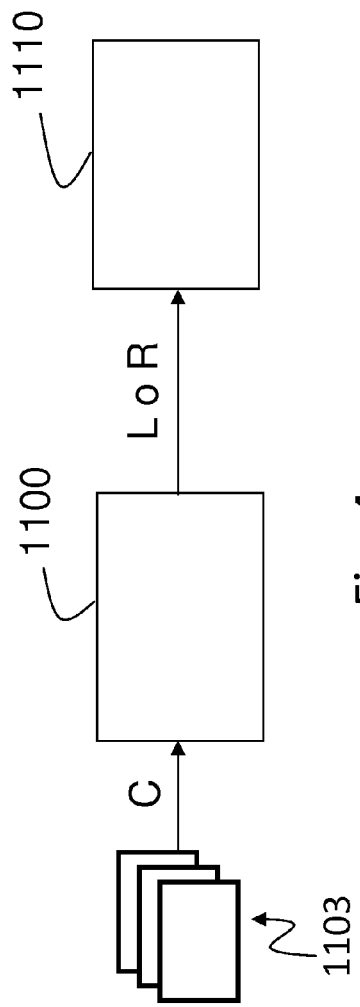
FIGS. 4a and 4b show block diagrams of a device for the fruition of television images received as a digital video stream, respectively in the case wherein the device only allows displaying 2D images and in the case wherein the device also allows displaying 3D images.

Referring now to FIG. 2, there is shown a block diagram of a device 100 for generating a stereoscopic video stream 101 according to the invention.

The device 100 receives two sequences of images 102 and 103, e.g. two video streams, intended for the left eye L and for the right eye R, respectively.

The device 100 allows multiplexing two images of the two image sequences 102 and 103. It comprises for this purpose an assembler module 105 capable of entering the pixels of input images into a single composite image C.

When in the following description reference is made to entering an image into a composite frame or container frame C, it is understood that this means to execute a procedure which generates (by using hardware and/or software means) a region of the composite frame C comprising the same pixels as the source image. If the composite image is of the type shown in FIG. 1a or 1b, in the copy step it is necessary to halve the number of pixels either horizontally or vertically. Therefore, the two left L and right R images entered into the composite frame C will be deformed and will have a halved horizontal or vertical resolution.

In a composite frame of a stereoscopic video stream in a format being alternative to that of FIG. 1c, if the input images have a size of 1280×720 pixels (the so-called 720 p format), which is one of the formats used for transmitting images with improved quality but not really with high definition, then a composite frame suitable for containing both images will be a frame having a size of 1920×1080 pixels, i.e. a frame of a 1080 p video stream (progressive format with 1920×1080 pixels).

In the case under examination, there is the advantage that the two right R and left L images can be entered into the composite frame C without being deformed and/or undersampled, but the price to pay is that one of the two images must be subdivided into at least three parts, as shown in the example of FIG. 1c.

It should be noted that in the alternative format of FIG. 1c the first image may be entered in any point of the container frame (so long as the latter does not require it to be disassembled into different areas); the disassembly of the frame of the second image and its insertion in the container frame may be accomplished according to many different techniques, the features of which are not relevant for the purposes of the present invention.

At any rate, the way in which the left L and right R images are arranged into the container frame C will not affect the implementation of the method according to the invention.

When coding the stereoscopic video stream, consisting of the sequence 101 of container frames C, at least one metadatum M is entered which contains a piece of information concerning that region of the composite frame C which a 2D decoder receiving the stereoscopic video stream 101 will have to output after the decoding process.

The metadata M is adapted to identify a region of the composite frame C containing an image for the left eye L or an image for the right eye R, provided that said image has not been disassembled into various parts, like the right image in the example of FIG. 1c.

If the stereoscopic video stream 101 is coded in accordance with the H.264/AVC standard, then the metadata M can advantageously replace the metadata relating to the "cropping rectangle", already provided for by that very standard in section 7.3.2.1.1 "Sequence parameter set data syntax" of the ITU T H.264 document of 03-2009, "Advanced video coding for generic audiovisual services".

Such metadata was originally introduced due to the fact that the H.264/AVC coding provides for disassembling the image into 16×16 pixel macroblocks, but 1080 is not a number divisible by 16. Therefore, the internal single-frame representation format used by an encoder may not coincide with the actual frame format (for 1920×1080 frames, the H.264/AVC encoder uses a representation over 1920×1088 pixels, thus adding eight empty lines). However, the metadata describing the "cropping rectangle" and included in the H.264/AVC standard, the function of which is to instruct the decoder as to which portion of the decoded frame must be outputted for reproduction, allows to define in an absolutely general manner a rectangular frame portion to be displayed.

In practice, this defines the distances from the frame edges, expressed in number of pixels, of the horizontal and vertical sides of the cropping rectangle delimiting the portion to be displayed.

In general, the image cropping rectangle can also be defined in other wholly equivalent manners; for instance, one may indicate the position of one vertex of the rectangle or the dimensions of the sides thereof, or the coordinates of two opposed vertices.

It follows that, by differently using the metadata M of the already standardised "cropping rectangle", and hence using the same syntax, it is possible to specify the reproduction of an arbitrary area of the composite frame C to a decoder compliant with the H.264/AVC specification.

Referring now to FIGS. 3a, 3b and 3c, there are shown by means of dashed lines some possible regions delimited by the cropping rectangle, the information about which must be contained, according to the invention, in at least one metadatum M.

For example, in the container frame C of FIG. 3a in side-by-side format and in the container frame C of FIG. 3c in the alternative format, the area covered by the cropping rectangle matches the area occupied by the left image L of the container frame C.

As a further example, in the container frame C of FIG. 3b in top-bottom format, the area covered by the cropping rectangle matches the area occupied by the right image R of the container frame C.

Once the coding stage is complete, the stereoscopic stream can be transmitted over a communication channel and/or recorded on a suitable medium (e.g. CD, DVD, Blu-ray, mass memory and the like).

FIG. 4a shows a normal system for viewing 2D contents, consisting of a decoder 1100 and a display or visualisation device 1110. The decoder 1100 makes available one of the two right R and left L images to the visualisation device 1110 (e.g. a television set), thereby allowing a user to view 3D contents in 2D. The decoder 1100 may be a set-top-box separate from the television set or it may be built in the television set itself.

Similar considerations apply to a player (e.g. a DVD player) reading a container frame and processing it to obtain a 2D image.

Referring back to FIG. 4a, the receiver system receives (via cable or antenna) a stereoscopic video stream 1103 containing composite frames C. A decoder 1100 reads the metadata M indicating which portion of the frames C must be used for displaying the stream on a display or visualisation device 1110. Subsequently, it extracts the image contained in the portion of the composite frame C specified by the metadata M and sends it to the display 1110.

It may happen that the format of the image outputted by the decoder 1100 is not included among those natively supported by the display 1110. For example, in the case of the 1080 p frame in side-by-side format, at decoding time the receiver 1100 will output a frame whose horizontal dimension will be half the horizontal dimension of the high-definition frame: the resulting frame area will thus be 960×1080 pixels and its format will be 8/9.

This is not an image format natively supported by the display, but it may be converted back into the 1920×1080 format by means of appropriate interpolation steps which can be carried out by a device included in all modern displays. This device is the so-called scaler, whose function is to adapt the received format to the one desired by the user (as a matter of fact, the remote controls of all recent television sets include a button for choosing among the 4/3, 16/9, 14/9 and auto formats, so that the image can be viewed in a format other than the native one).

If the composite frame is of the type shown in FIG. 1c, then the format of the 2D compatible image will be of the 720 p type: the latter is a standard format which can be handled by all HDTV or HD Ready television sets. It follows that the scaler will certainly be able to expand the compatible image to cover the full screen.

Tests carried out on a number of television sets have shown that, even when composite frames like those shown in FIG. 1a or FIG. 1b are used, the scaler can display the compatible images correctly, i.e. by converting them back to the full-screen 16/9 format.

Viewing the stereoscopic video in 3D mode will however only be possible by using a new-generation decoder equipped with means adapted to recognise a specific signalling contained in the stereoscopic video stream and capable of decoding the video without applying the cropping rectangle.

This result can be achieved in several ways. For example, an additional metadatum N may be added to specify that the cropping rectangle is only valid for 2D decoders/television sets.

Thus, existing 2D products will not have to be updated nor will they require any firmware/hardware changes.

In a preferred embodiment of the invention, the metadatum N specifying whether the original cropping rectangle must be used or not may simply be the metadatum that specifies whether it is a 3D or 2D transmission.

The transmission of this metadatum N may occur, for example, in at least one SI (Service Information) table or in the H.264 SEI (Supplemental Enhancement Information) messages. As an alternative, one or more rows of the composite frame may be dedicated to the transmission of 3D-specific metadata.

Figure 4B:
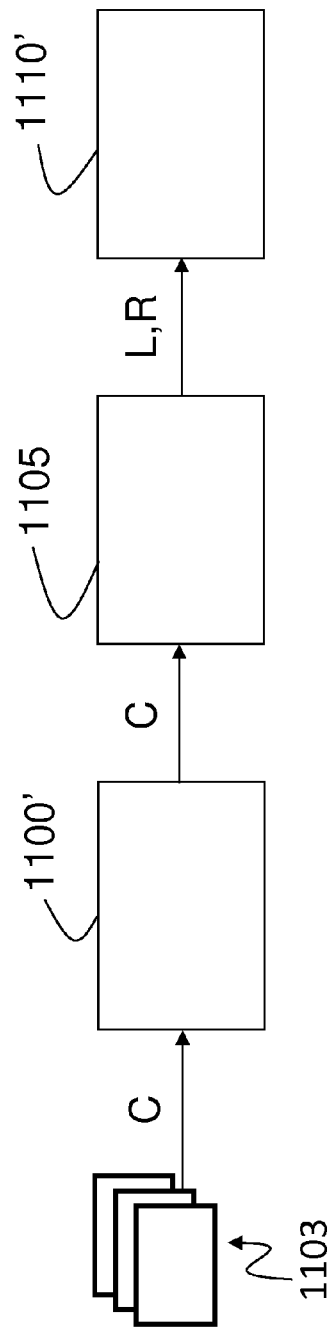

FIG. 4b shows a receiver system suitable for displaying 3D contents. Such a system is made up of three parts, which may be independent apparatuses or may be assembled together in various ways. Said parts are the following: a decoder 1100', a de-packer 1105, and a display 1110'.

From a comparison with FIG. 4a it becomes apparent that an additional component is required, i.e. the de-packer 1105. The decoder 1100' outputs the sequence of composite frames C in their entirety, i.e. ignoring the cropping rectangle information: it is therefore a non-standard decoder, since prior-art standard decoders only output, after decoding the frame, that image portion which is contained in the cropping rectangle. The de-packer 1105 extracts the images L and R from the composite frames C and outputs them to the display 1110' in the modes required by the display 1110' itself.

To do so, the de-packer 1105 must know how the composite frame was built. A de-packer 1105 suitable for processing various formats, as opposed to a single format, must therefore read metadata P specifying such modes.

Said metadata P may be entered into the SI tables or the SEI messages, or into one row of the composite frame. In the first case it is necessary that the decoder 1100' reads said metadata and sends it to the de-packer 1105, e.g. through an HDMI interface: it should be noted that the specification of said interface has been recently updated for this very purpose. In the second case the situation is simpler because the de-packer 1105 will find the metadata P directly in the composite frame.

The features of the present invention, as well as the advantages thereof, are apparent from the above description.

A first advantage of the present invention is that a broadcaster wanting to broadcast a 3D program that can also be decoded by a 2D decoder will not have to transmit two simultaneous video streams, thus using less bandwidth to transport the video stream.

A second advantage of the present invention is that the method can always be applied regardless of how the frames carrying the right and left images are packed into a container frame.

The method for generating and rebuilding a stereoscopic video stream and the related generating and rebuilding devices may be subject to many possible variations without departing from the novelty spirit of the inventive idea; it is also clear that in the practical implementation of the invention the illustrated details may have different shapes or be replaced with other technically equivalent elements.

For example, while in the above description reference has been made in particular to the H.264/AVC standard, it is clear that the method is also applicable when coding is executed in accordance with other standards, provided that said standards use metadata similar to that used for defining the cropping rectangle of the H.264/AVC standard.

For example, even though particular reference has been made in the present description to composite frames in the 1080 p format, it is clear that the invention is not dependent on the size of the composite frame and of the images making up the frames: the invention is therefore also applicable to the case wherein the composite frame has the 720 p size or is of the very high resolution type (the so-called 2 k and 4 k formats, i.e. having approx. 2,000 or 4,000 lines).

It can therefore be easily understood that the present invention is not limited to a method for generating and rebuilding a stereoscopic video stream and to the related devices, but may be subject to many modifications, improvements or replacements of equivalent parts and elements without departing from the inventive idea, as clearly specified in the following claims.

The invention claimed is:

1. A method for generating a digital stereoscopic video stream comprising container frames (C), said container frames (C) comprising information about a right image (R) and a left image (L), the method comprising:

coding said digital stereoscopic video stream, when coding said digital stereoscopic video stream, entering at least one metadatum (M) which is adapted to identify a region of a container frame (C) containing only one of said two images (L, R) into the digital stereoscopic video stream, wherein the digital stereoscopic video stream is coded according to the H.264/AVC standard which defines a cropping rectangle or a standard using metadata similar to those used for defining the cropping rectangle of the H.264/AVC standard, and wherein said at least one metadatum (M), while using the same syntax as the standard, refers to only one of the two images (L, R) contained in said container frame (C).

2. A method according to claim 1, wherein the dimensions of said at least one region of said container frame (C) are such that it can be displayed without requiring any changes to the width/height ratio of said region.

3. A method according to claim 1, wherein said at least one region of said container frame (C) is interpolated and format-converted so that it can be displayed in full screen in the 16/9 format.

4. A method according to claim 1, wherein at least one additional metadatum (N, P) is entered into the digital stereoscopic video stream to indicate to the stereoscopic decoder that said at least one metadatum (M) must be ignored.

5. A method according to claim 4, wherein said additional metadatum (N, P) is sent in at least one SI table or in the SEI messages concerning said digital stereoscopic video stream coded in accordance with the H.264/AVC standard or a standard using metadata similar to those used for defining the cropping rectangle of the H.264/AVC standard.

6. A method according to claim 4, wherein said at least one additional metadatum (N) is the metadatum which indicates whether the program is in 2D or 3D.

7. A device for coding a digital stereoscopic video stream comprising container frames (C), said container frames (C) comprising information about a right image (R) and a left image (L), and further comprising means adapted to implement the method according to claim 1.

8. A method for rebuilding at least one 2D-compatible image starting from a digital stereoscopic video stream generated according to the method of claim 1, the method comprising:

decoding said digital stereoscopic video stream, when decoding said digital stereoscopic video stream, extracting the at least one metadatum (M) which is adapted to identify the region of the container frame (C) containing only one of said two images (L,R), wherein the digital stereoscopic video stream is decoded according to a standard using metadata similar to those used for defining the cropping rectangle of the H.264/AVC standard, and wherein said at least one metadatum (M), while using the same syntax as the standard, refers to only one of the two images (L, R) contained in said container frame (C).

9. A method according to claim 8, wherein the dimensions of said at least one region of said container frame (C) are such that it can be displayed without requiring any changes to the width/height ratio thereof.

10. A method according to claim 8, wherein said at least one region of said container frame (C) is interpolated and format-converted so that it can be displayed in full screen in the 16/9 format.

11. A decoder adapted to rebuild at least one 2D-compatible image starting from a stereoscopic video stream comprising container frames (C), said container frames (C) comprising information about a right image (R) and a left image (L), and further comprising means for implementing the method according to claim 8.

12. A method for decoding a digital stereoscopic video stream and extracting the two right (R) and left (L) images of a container frame (C), the method comprising:
reading, by a decoder, at least one metadatum (N, P) indicating whether the video stream is stereoscopic or not and, if said video stream is stereoscopic:
information contained in at least one additional metadatum (M) defining a cropping rectangle is ignored;
a sequence of container frames (C) is produced integrally;
said sequence of container frames (C) is sent to a de-packer, which produces said two right (R) and left (L) images as required by a stereoscopic display.

13. A method according to claim 12, wherein said decoder sends to said de-packer additional metadata (P) indicating how the left (L) and right (R) images have been packed, in particular contents of the SI field and/or of the SEI message pertaining to said stereoscopic video stream.

14. A method according to claim 12, wherein said de-packer reads additional metadata (P) contained in a container frame and indicating how the left (L) and right (R) images have been packed.

15. A method according to claim 13, wherein said additional metadata (P) contains cropping rectangles for each region of the composite frame (C).

16. A method according to claim 12, wherein if said metadatum (N) indicates that said video stream is not stereoscopic, then the decoder reads the information contained in said at least one additional metadatum (M) that defines said cropping rectangle and sends the image defined by said cropping rectangle to the display.

17. A decoder adapted to decode a digital stereoscopic video stream and extract the two right (R) and left (L) images of a container frame (C), comprising means for implementing the method according to claim 12.

18. A decoder adapted to decode a digital stereoscopic video stream and extract an image of a container frame (C), comprising means for implementing the method according to claim 16.

19. A de-packer adapted to produce the right and left images of a stereoscopic video stream as required by a stereoscopic display according to claim 12.

20. A stereoscopic video stream comprising at least one container frame (C) and at least one metadatum (M, N, P) according to claim 1.

21. A method according to claim 4, wherein said at least one additional metadatum (P) is the metadatum which indicates how the container frame (C) was built.

22. A method according to claim 12, wherein said at least one additional metadatum (M) is that defined according to the H.264/AVC standard.

23. A method according to claim 12, wherein said at least one additional metadatum (M) is that defined according to a standard using metadata similar to those used for defining the cropping rectangle of the H.264/AVC standard.

24. A non-transitory computer-readable medium containing a stereoscopic video stream according to claim 20.

25. A method for generating a digital stereoscopic video stream that includes a plurality of container frames, the method comprising:
entering a left image and a right image into the same container frame, wherein one of the left image and the right image is divided into multiple parts;
coding the container frame according to a standard that specifies a metadatum that defines a cropping rectangle;
replacing the metadatum associated with the container frame that defines the cropping rectangle with a first metadatum that identifies a region of the container frame that includes one of the left image or the right image, wherein the first metadatum uses a syntax of the standard and wherein the first metadatum refers to only one of the left image and the right image contained in the container frame, wherein the first metadatum allows the digital stereoscopic video stream that includes both the left image and the right image to be displayed as 2D content by displaying only the region of the container frame defined by the at least one metadatum;
including a second metadatum in a message associated with the standard, wherein the second metadatum specifies that the cropping rectangle is only valid for 2D decoders, wherein the second metadatum allows a 3D decoder to ignore the first metadatum such that 3D content is displayed; and
including a third metadatum in a message associated with the standard, wherein the third metadatum specifies how the left image and the right image were entered into the same container frame.

* * * * *